US007693762B1

(12) United States Patent
Dagum et al.

(10) Patent No.: US 7,693,762 B1
(45) Date of Patent: Apr. 6, 2010

(54) METHOD AND APPARATUS FOR UTILITY PRICING ANALYSIS

(75) Inventors: Leonardo Dagum, Redwood City, CA (US); Vivek Vaidya, Sunnyvale, CA (US); Paul Dagum, San Francisco, CA (US)

(73) Assignee: Rapt, Inc., San Francisco, CA (US)

( * ) Notice: Subject to any disclaimer, the term of this patent is extended or adjusted under 35 U.S.C. 154(b) by 1804 days.

(21) Appl. No.: 10/304,467

(22) Filed: Nov. 26, 2002

Related U.S. Application Data

(60) Provisional application No. 60/333,377, filed on Nov. 26, 2001.

(51) Int. Cl.
*G06Q 40/00* (2006.01)
(52) U.S. Cl. ...................................................... 705/35
(58) Field of Classification Search ................... 705/35, 705/412
See application file for complete search history.

(56) References Cited

U.S. PATENT DOCUMENTS

| | | | | |
|---|---|---|---|---|
| 6,088,688 | A * | 7/2000 | Crooks et al. | 705/412 |
| 2002/0165816 | A1 * | 11/2002 | Barz | 705/37 |
| 2003/0009401 | A1 * | 1/2003 | Ellis | 705/35 |
| 2003/0149648 | A1 * | 8/2003 | Olsen et al. | 705/35 |

OTHER PUBLICATIONS

Bass, Frank M., Purdue University, *A New Product Growth for Model Consumer Durables*, Management Science, vol. 15, No. 5, Jan. 1969, pp. 216-227.

Dagum, Camilo, Econometric Research Program Princeton University, *Structural Permanence: Its Role in the Analysis of Structural Dualisms and Dependences and for Prediction and Decision Purposes*, The Economics of Structural Change vol. 1, The International Library of Critical Writings in Economics, An Elgar Reference Collection, 1969, pp. 211-235.

Mahajan, Vijay, Muller, Eitan and Bass, Frank M., *New-Product Diffusion Models*, Chapter 8, Handbooks in OR & MS, vol. 5, J. Eliashberg and G.L. Lilien, Eds., 1993, pp. 349-408.

Hanssens, Dominique M. And Leonard, J. Parsons, *Econometric and Time-Series Market Response Models*, Chapter 9, Handbooks in OR & MS, vol. 5, J. Eliashberg and G.L. Lilien, Eds., 1993, pp. 409-464.

\* cited by examiner

*Primary Examiner*—James A Kramer
*Assistant Examiner*—James A Vezeris
(74) *Attorney, Agent, or Firm*—Perkins Coie LLP

(57) ABSTRACT

In one implementation, a volatility of expected service usage is calculated along with an expected revenue. User input provides estimates of service usage such as an estimated high usage, an estimated low usage, and a swing range of percentiles for the high and low usage estimates, for each time period in a plurality of future time periods. A user also provides a schedule of prices that are based on usage rates. A model volatility is calculated based on the swing range of percentiles, the estimated high and low usage, and a cumulative density function, such as a cumulative lognormal density function, for each time period in a plurality of time periods. The expected usage and the schedule of prices, along with any discount plans, are also used to calculate an estimated revenue.

17 Claims, 7 Drawing Sheets ions may fall within the scope of the invention which is defined in the claims following the description.

METHOD AND APPARATUS FOR UTILITY PRICING ANALYSIS

CROSS REFERENCE TO RELATED APPLICATIONS

This invention claims priority from Provisional Patent Application Ser. No. 60/333,377, entitled "METHOD AND APPARATUS FOR UTILITY PRICING ANALYSIS", filed Nov. 26, 2001, having L. Dagum and V. Vaidya as inventors, and having as assignee Rapt, Inc., the assignee of the present invention. This provisional is incorporated herein by reference, in its entirety and for all purposes.

BACKGROUND OF THE INVENTION

1. Field of the Invention

The present invention relates to pricing, and, more particularly, to a method and apparatus for analyzing utility pricing.

2. Description of the Related Art

As the cost of information technology (IT) infrastructure increases, customers increasingly risk over- and under-investing in technology capital. System vendors and service providers are now making available utility-based pricing services, in which customers need only pay for the computing services used. Flexible methods for modeling these types of contracts, including their expected returns and variance, are needed. In particular, a method and apparatus for the economic analysis of utility pricing would prove very helpful in performing such analysis. More specifically, what is needed is an analytic method for predicting the revenue, along with risk and uncertainty, from utility based pricing of an entity's infrastructure (e.g., corporate information technology infrastructure.)

SUMMARY OF THE INVENTION

In one embodiment, an architecture for the analysis of utility pricing is disclosed.

The foregoing is a summary and thus contains, by necessity, simplifications, generalizations and omissions of detail; consequently, those skilled in the art will appreciate that the summary if illustrative only and is not intended to be in any way limiting. As will also be apparent to one of skill in the art, the operations disclosed herein may be implemented in a number of ways, and such changes and modifications may be made without departing from this invention and its broader aspects. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

The use of the same reference symbols in different drawings indicates similar or identical items.

DETAILED DESCRIPTION OF THE INVENTION

Figure 1:
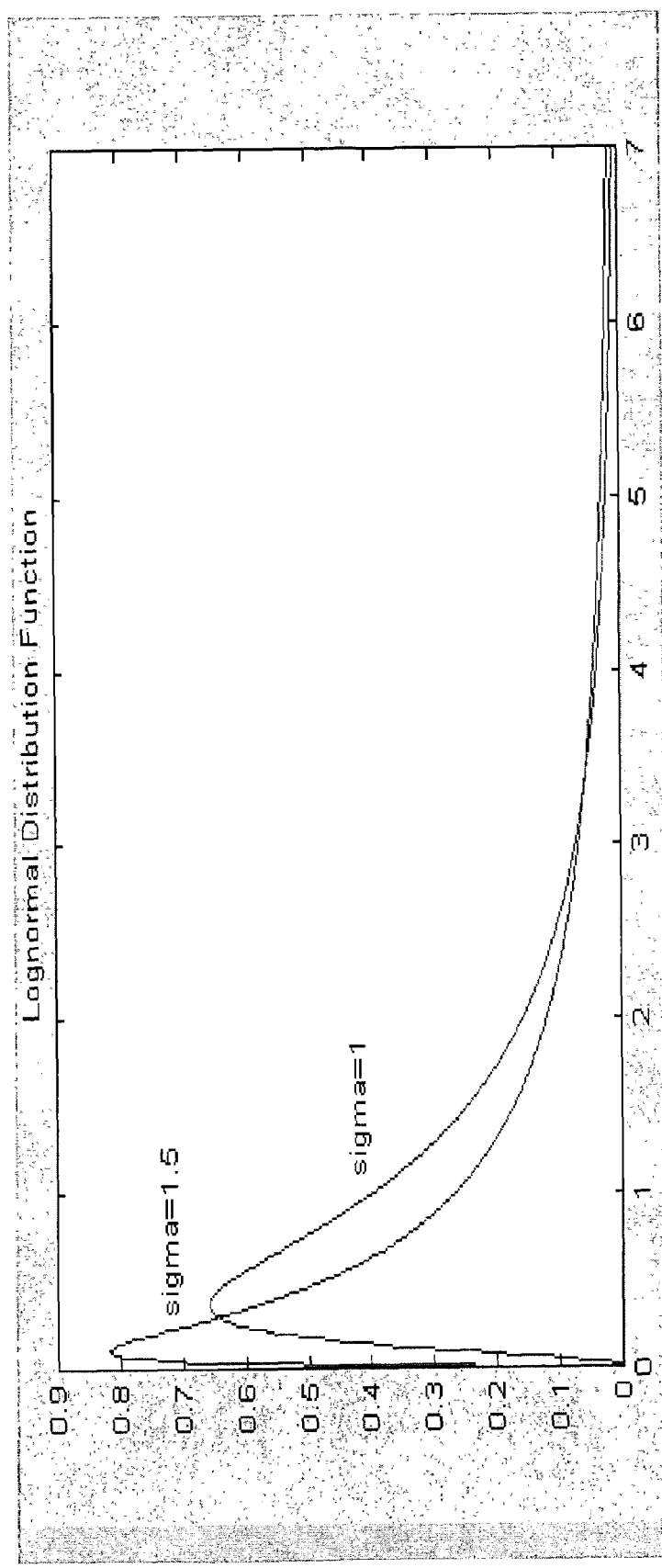
FIG. 1 is a graph depicting two lognormal distributions

The following is intended to provide a detailed description of an example of the invention and should not be taken to be limiting of the invention itself. Rather, any number of variations may fall within the scope of the invention which is defined in the claims following the description.

Introduction

For the purposes of the present invention, a usage-based pricing methodology, also referred to herein as a pricing algorithm, refers to a schedule of prices that depends on a user's utilization of a device as measured by one or more metrics. A device refers to any hardware resource or software application. For a given device, and for each applicable metric, the capacity of that metric refers to the maximum metric output of the device. The device may be resident with the user in which case any excess metric capacity is not utilized by the user and remains idle. Alternatively, the device may reside with the device provider, in which case idle device capacity may be consumed by other users.

The present invention provides techniques that 1) compute the expected net present value (NPV) of a pricing algorithm and the variance around that value; 2) computes the upside and downside risks of a pricing algorithm; 3) provides updates of the values in (1) and (2) as new customer usage data becomes available; 4) given a target NPV, determines the pricing algorithm that minimizes the variance; 5) given a target variance on the NPV, determines the pricing algorithm that maximizes the expected NPV; 6) computes the expected NPV and variance of a portfolio of devices that may be in different stages of their usage lifecyle and that may differ in pricing algorithms used; and 7) given a target aggregate NPV for the portfolio, dynamically adjusts the pricing algorithms to minimize the portfolio variance.

An Example of Utility Analytics

This section describes a mathematical model and its implementation as an analytic engine according to the present invention. This section focuses primarily on the one dimensional problem, in which price is a function of a single variable, and the consumed service has no further dependent components. For example, consider usage based pricing of central processing units (CPUs) in a multiprocessor computer system. The price is a function only of the number of CPUs used, and consumption of a CPU places no additional provisioning burden on the service provider (i.e., there is no other dependent component).

The basic problem that the utility analytic engine attempts to solve is "What is my revenue for this price schedule and assuming this adoption profile?". There is uncertainty in the adoption profile and that is reflected in the resulting revenue. The applicable price is path dependent.

The basic methodology models the usage as a stochastic process and generates usage paths representative of the specified adoption profile and its distribution. For each usage path, a price schedule can then applied and one arrive at a "revenue" path. Given a statistically significant number of such revenue paths, the expected revenue can be computed, as well as percentile bands around that expected revenue.

Stochastic Model

Two different stochastic models can be applied to this problem, either an additive model or a multiplicative model. The main distinction is in the resulting distributions around the means for any forward step in the process. An additive model results in a normal distribution, whereas a multiplicative model results in a lognormal distribution. In the finance world, the lognormal distribution is usually preferred because such a distribution more accurately reflects price movements, although this alternative is not mandatory. Such a distribution also has the property that the random variable is always positive. This is more "physically" representative of prices. Utility has a similar constraints (i.e., negative usage values are not possible). Consequently, the multiplicative model is implemented first, although an additive model in the analytic engine can also be employed.

The multiplicative model in continuous time is defined by:

$$dlnU(t) = \upsilon(t)dt + \sigma(t)dz \quad (1)$$

where $U(t)$ is the usage at time $t$, $\upsilon(t)$ and $\sigma(t) \geq 0$ and represent the time-dependent drift and volatility terms in the model, and $z$ is a standard Wiener process defined as:

$$dz = \epsilon(t)\sqrt{dt} \quad (2)$$

where $\epsilon(t)$ is a standardized normal random variable. With the model written in this fashion, an Euler discretization can be used to arrive at the simulation equation in multiplicative form:

$$lnU(t_{k+1}) - lnU(t_k) = \upsilon(t_k)\Delta t + \sigma(t_k)\epsilon(t_k)\sqrt{\Delta t} \quad (3)$$

or $$U_{k+1} = e^{\upsilon_k \Delta t + \sigma_k \epsilon(t_k)\sqrt{\Delta t}} U_k \quad (4)$$

where the subscript $k$ is used to refer to values evaluated at time $t_k$. Given $$\upsilon = \mu - \frac{1}{2}\sigma^2,$$

the resulting distribution for $U_k$ is lognormal. It will be noted that this form of the simulation equation guarantees $U_k \geq 0$. Equation (4) can be derived from the standard form for a geometric Wiener process:

$$dU(t) = \mu(t)U(t)dt + \sigma(t)U(t)dz \quad (5)$$

by applying Ito's lemma for a governing process $F(U(t)) = lnU(t)$. It will be noted that Equation 5 could have been discretized directly. However, the resulting simulation equation would not guarantee $U(t) \geq 0$, although the distributions are still lognormal.

Monte Carlo and Quasi Monte Carlo Simulation

Consider a utility contract with n billing intervals, $k = [0, n]$. A usage path can be defined as an instantiation of the usage over the length of the contract. Equation 4 can be used to instantiate the usage for a utility contract, in other words, Equation 4 can be used to generate possible usage paths. If the set $[\epsilon_1, \ldots, \epsilon_n]$ denotes an instantiation of $\epsilon(t_1), \ldots, \epsilon(t_n)$, and this set is applied to Equation 4, a corresponding usage path $[U_1, \ldots, U_k]$ can be generated. For the case where there is a hard maximum limit on usage (e.g. the usage is measured on CPU's and there exists a fixed number of CPU's in the system), the usage path is limited to stay within the maximum possible $U_{max}$. As long as the lognormal formulation of Equation 4 is used, there is no need to do anything special for the opposite boundary at zero usage.

Equation 4 can be solved by generating a representative sample of usage paths, and from these, deriving the moments of interest (primarily the mean and certain percentile bands). This, of course, is the well known Monte Carlo method of simulation.

The standardized normal random variable $\epsilon(t_k)$ is sampled in one of three ways:

1. Halton sequence
2. Faure sequence
3. Pseudo-random sequence

The first two are low-discrepancy quasi-random sequences which are popular for their superior convergence. It is use of these sequences that gives rise to a so-called Quasi Monte-Carlo method. Using a purely pseudo-random sequence makes the approach a standard Monte Carlo approach. It will be noted that for the standard Monte Carlo scheme, the error is expected to be proportional to $1/\sqrt{N}$, where N is the sample size (i.e. number of usage paths generated). It is reasonable to expect the Quasi Monte Carlo scheme to perform at least as well. It will be noted that, for these relatively simple one-dimensional problems, performance is typically not a critical factor.

Model Estimation

For this example, no actual usage data are assumed. Consequently, the model inputs are entirely users estimates on the expected adoption of the sold configuration. For every billing period k of the utility contract, the user inputs an expected mean adoption, as well as a low and high value for some percentile swing around the mean. From these four inputs, the most closely approximating lognormal distribution id found and the appropriate $\upsilon(t_k)$ and $\sigma(t_k)$ to use in our model is derived.

Some basic properties of the lognormal distribution function are now presented as way of background. For consistency, u is used for the random variable. The distribution function is given by:

$$f(u) = \frac{1}{\sqrt{2\pi}\,\sigma u} e^{-\frac{(\ln u - \upsilon)^2}{2\sigma^2}}$$

It has the following moments:

$$E(u) = e^{(\upsilon + \sigma^2/2)} \quad (7)$$

$$E(lnu) = \upsilon \quad (8)$$

$$var(u) = e^{(2\upsilon + \sigma^2)}(e^{\sigma^2} - 1) \quad (9)$$

$$var(lnu) = \sigma^2 \quad (10)$$

For simplicity, Equation (7) is written as $ln(E) = \upsilon + \sigma^2/2$.

FIG. 1 is a graph depicting a lognormal distribution function for two different variances and $\upsilon = 0$. FIG. 1 presents two lognormal distributions, one with $\sigma^2 = 1$ and the other with $\sigma^2 = 1.5$, and both with $\upsilon = 0$. It will be apparent to one of skill in the art that increasing the variance results in a fatter tail and a narrower peak, the latter possibly not what one familiar with the normal distribution would expect. The intuitive reason for this result is that the entire range $[-\infty, 0]$ of the normal distribution is mapped to the range $[0, 1]$ in the lognormal. The larger variance in the normal distribution results in a fatter tail, and the "far" negative half of this distribution maps to the range near 0 in the lognormal distribution. Consequently, a narrower (but taller) peak is observed in the lognormal for increasing variance. Also, it will be observed by this same reasoning that the area of the lognormal for the range [0,1] and [1,∞] is exactly 0.5.

With these preliminaries in place, the estimating model parameters from the user inputs can now be examined. It is assumed that the user has greatest confidence in the input expected mean, $E_k$, so the resulting distribution should match this value. Preferably, the resulting distribution matches this value exactly. Two equations for the means can be written as:

$$\ln(E_k) = \upsilon_L + \frac{1}{2}\sigma_L^2$$

and $$\ln(E_k) = \upsilon_H + \frac{1}{2}\sigma_H^2$$

where the subscripts L and H refer to the lognormal distributions that match the input values for the low and high percentile swings respectively. The model parameters can be chosen as:

$$\upsilon' = \frac{1}{2}(\upsilon_L + \upsilon_H)$$

and $$\sigma' = \sqrt{(\sigma_L^2 + \sigma_H^2)/2} \qquad (14)$$

It will be noted that σ' is modeled as the average of the squares of the $\sigma_L$ and $\sigma_H$, rather than just a straight average.

Figure 2A:
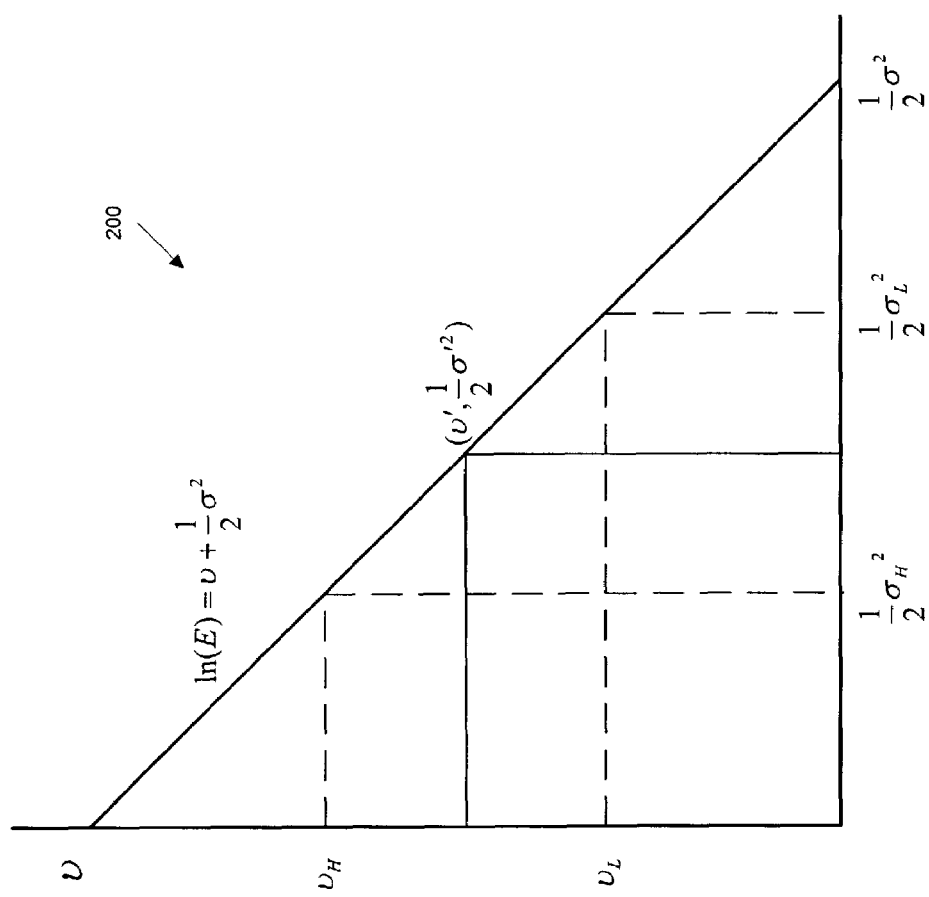
FIG. 2A is a graph depicting the locus of ln(E) points mapped over $$\left(v, \frac{1}{2}\sigma^2\right).$$

FIG. 2A is a graph 200 depicting the locus of ln(E) points mapped over $$\left(\upsilon, \frac{1}{2}\sigma^2\right).$$

FIG. 2A illustrates the reason for the preceding choice (that σ' is modeled as the average of the squares of the $\sigma_L$ and $\sigma_H$) in a graphical fashion, which is that values of υ and σ that best satisfy Equations (11) and (12) are preferably chosen. The locus for ln(E) is a straight line with negative slope, when mapped on (υ, σ²). Equations (13) and (14) give the point of the ln(E) locus exactly midway between the points $(\upsilon_L, \sigma_L^2)$ and $(\upsilon_H, \sigma_H^2)$.

The values $\upsilon_L$, $\sigma_L$, $\upsilon_H$, and $\sigma_H$ are computed from the inputs as follows. The low and high input values correspond to the cumulative density function $F(U_L)$ and $F(U_H)$, where $U_L=0.5-\delta$ and $U_H=0.5+\delta$ and δ is the swing normalized to 1 of course). $\sigma_L$ is computed by numerically solving the integral equation:

$$F(U_L) - \frac{1}{\sqrt{2\pi}\sigma_L}\int_0^{U_L}\frac{\exp\left(\frac{-(\ln u - \ln E + 0.5\sigma_L^2)^2}{2\sigma_L^2}\right)}{u}du = 0$$

Once $\sigma_L$ is computed, Equation (11) is used to compute $\upsilon_L$, and then the process for $\sigma_H$ and $\upsilon_H$ repeated. Then equation (14) is applied to arrive at a variance for our model lognormal.

At this point, equation (13) can be applied to determine a mean. However, the resulting mean would not necessarily provide the prescribed drift in the Wiener process. Equation (4) is used to derive a value for υ in our model lognormal. The expectation of both sides of the equation is taken, while noting that $\epsilon_k$ is a standardized normal variable with zero mean. The equation for the mean can then be written as:

$$\upsilon_k \Delta t = \ln\left(\frac{\langle U_{k+1}\rangle}{\langle U_k\rangle}\right).$$

Model Estimation From Actual Usage Data

For example, one can assume that a set of actual usage paths representing a market segment of interest is available. Identifying the interesting market segments is an exercise in itself, however it can be imagined as an example that actual usage data for a telephone company running customer relationship management (CRM) applications is available, and this data set is large enough to analyze statistically. To begin such an analysis, all the usages are normalized by 1, and the actual start dates adjusted so all usages start at the same time. Seasonal effects are preferably removed prior to adjusting the start dates. At this point, for every billing period, a set of actual usage points are available which presumably can be fit with a lognormal distribution.

Let $u_i$ be an actual usage value for billing interval k. The distribution can be estimated as follows:

$$v_i = \ln(u_i) \qquad (17)$$

$$\bar{v} = \frac{1}{m}\sum_{i=1}^{m} v_i$$

$$\sigma^2 = \frac{1}{m-1}\sum_{i=1}^{m}(v_i - \bar{v})^2$$

where it is noted that $\bar{v}$ is only an approximation of the true mean, consequently, in Equation 19, compensation is provided by using m−1 in the denominator rather than m. It will be noted that it is assumed that the error in (17) is acceptable.

Revenue and Discounts

A revenue path is generated from a usage path by applying a price schedule P(U). In the absence of any discounts, P is a simple table of price versus usage, and can be applied directly for any billing interval k as $P_k=P(U_k)$. However, with discounts, the price is dependent on the past usage, so we have $P_k=P(\Sigma U_k)$. Discounts can be defined for example, with four parameters:

1. the discount period K.
2. the required average usage $\tilde{U}_R$.
3. the usage threshold $\tilde{U}$.
4. the discount amount δ.

And in greater detail:

1. The discount period is the period at which the discount first applies. Discounts apply on subsequent usage, so the price at the discount period itself is not itself affected by the discount.
2. The required average usage is the minimum average usage that will qualify the customer for the discount. In the analytic engine, any specified historical window can be averaged over. However, the user can be allowed to specify this detail. Alternatively, the average usage can be measured from the beginning of the contract.
3. The usage threshold is the minimum usage that a customer has to maintain for the discount to apply in future periods (this depends on the type of discount, as described below).
4. The discount amount is the amount that the base price is reduced when the discount is applied. If the base price for a billing period k is $P_k$, then the discounted price is $P'_k=(1-\delta)P_k$.

Three different kinds of discounts can be defined, for example, based on how the usage threshold is applied. An eternal discount is defined as a discount which can never be revoked once applied, so $\tilde{U}$ is never considered. Alternatively, a fair discount is defined as one where the discount applies in billing periods k>K only if the usage $U_k \geq \tilde{U}$. Finally, a use or lose discount can be defined as a discount which is fully revoked (i.e. can never apply again) if for any billing period k>K there is a usage $U_k < \tilde{U}$.

A utility contract may include more than one discount over the life of the contract. The index i=0, 1, . . . , m is used to identify multiple discounts in a contract. A discount cycle is the billing periods $K_i \leq k < K_{i+1}$. When either a fair or use or lose discount is applied, all subsequent periods should be tested to ensure that the usage still qualifies for the discount. If the usage does not qualify, then the last applied discount is tested against and so on until either a discount applies or the base price is used.

Figure 2B:
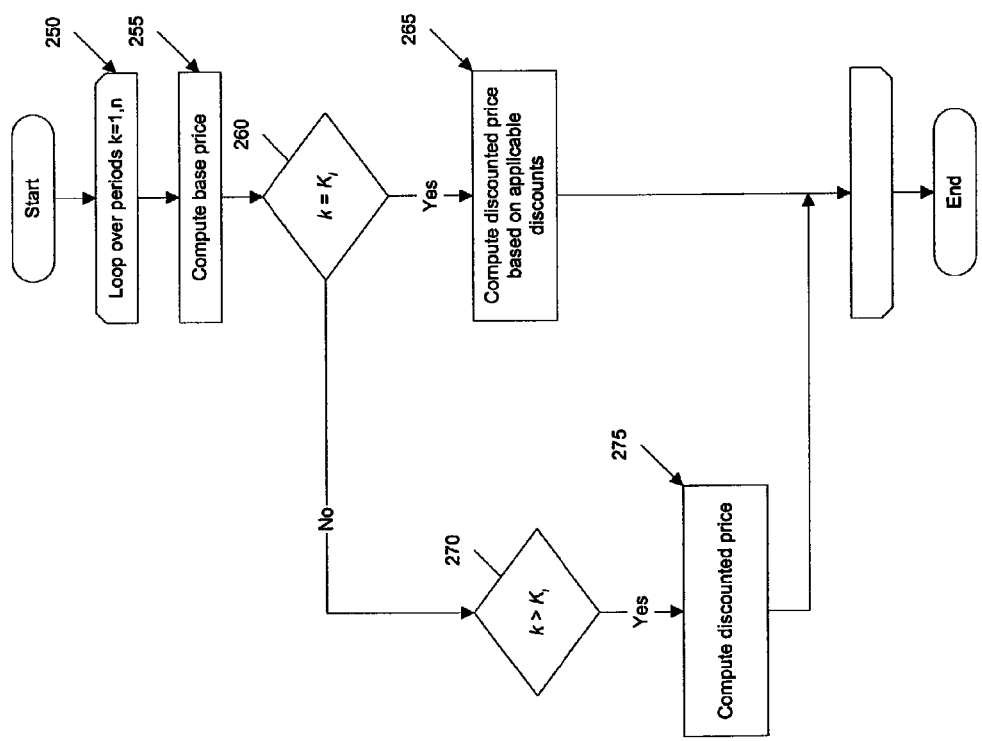
FIG. 2B is a flow diagram providing a technique for computing applicable prices according to the present invention.

FIG. 2B is a flow diagram that provides the basic algorithm for computing applicable prices. This process proceeds as follows:
1. Loop over periods k=1, n and compute the base price $P_k=P(U_k)$ (steps 250 and 255). Loop iterations are modified in the presence of discounts as indicated in subsequent steps.
2. For k=$K_i$ (step 260), the discounted price, if any, first is computed based on what discounts apply (see step 3, this only matters for i>0) (step 265). We then compute the average usage $$\langle U \rangle_{K_i} = \frac{1}{K_i} \sum_{1}^{K_i} U_k$$

and compare this to the required average usage $\tilde{U}_R$. If $\langle U \rangle_{K_i} \geq \tilde{U}_R$, then discount i applies. A boolean array $\beta_i$ can be used to track which discount cycles have qualified.
3. For k>$K_i$ (step 270), the discounted price is computed as $P'_k=(1-\delta_j)P_k$ where $\delta_j$ is the applicable discount amount (step 275). For eternal discounts, j is always equal to the last applied discount. For fair discounts, the largest j' which satisfies $U_k \geq \tilde{U}_{j'}$ is first found, and then the largest $j \leq j'$ for which $\beta_j$ is true is determined. Use or lose discounts are the same as fair discounts except that $\beta_j$ is set to false for the set $j \in [j'+1, i]$.

Given a usage $U_k$ and the applicable price $P'_k$, the revenue due to usage is simply computed as the product of the two. The total revenue also includes an anchor amount $A_k$, typically specified as a fraction of the corresponding lease payment although in general it may be time dependent. Thus the total revenue for a billing period k is given by:

$$R_k = A_k + U_k P'_k \qquad (20)$$

Given a representative sample size of revenue paths generated in this way, we can compute the means and any desired percentile using standard methods.

Equation (16) gives the revenue result as future value. Given a per-period interest rate $r_k$, this can be converted to a present value as:

$$PV(R_k) = \frac{R_k}{\Pi(1+r_k)}$$

Although it is unlikely that interest rates be known exactly for future periods, it is common for large companies (through the use of various financial instruments) to have locked interest rates over some range of future periods. It should be noted that costs should include fixed costs, free trial periods, and any other odd and miscellaneous items not already covered.

A process according to embodiments of the present invention is depicted in FIG. 2B, and other processes according to the present invention are also discussed herein. It is appreciated that operations discussed herein may consist of directly entered commands by a computer system user or by steps executed by application specific hardware modules, but the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user using, for example, a computer system such as the storage router previously mentioned, or a similar network element, as well as a computer system such as computer system 510. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media, optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like, and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

An Example Implementation of a Utility Pricing Analysis System

Figure 3:
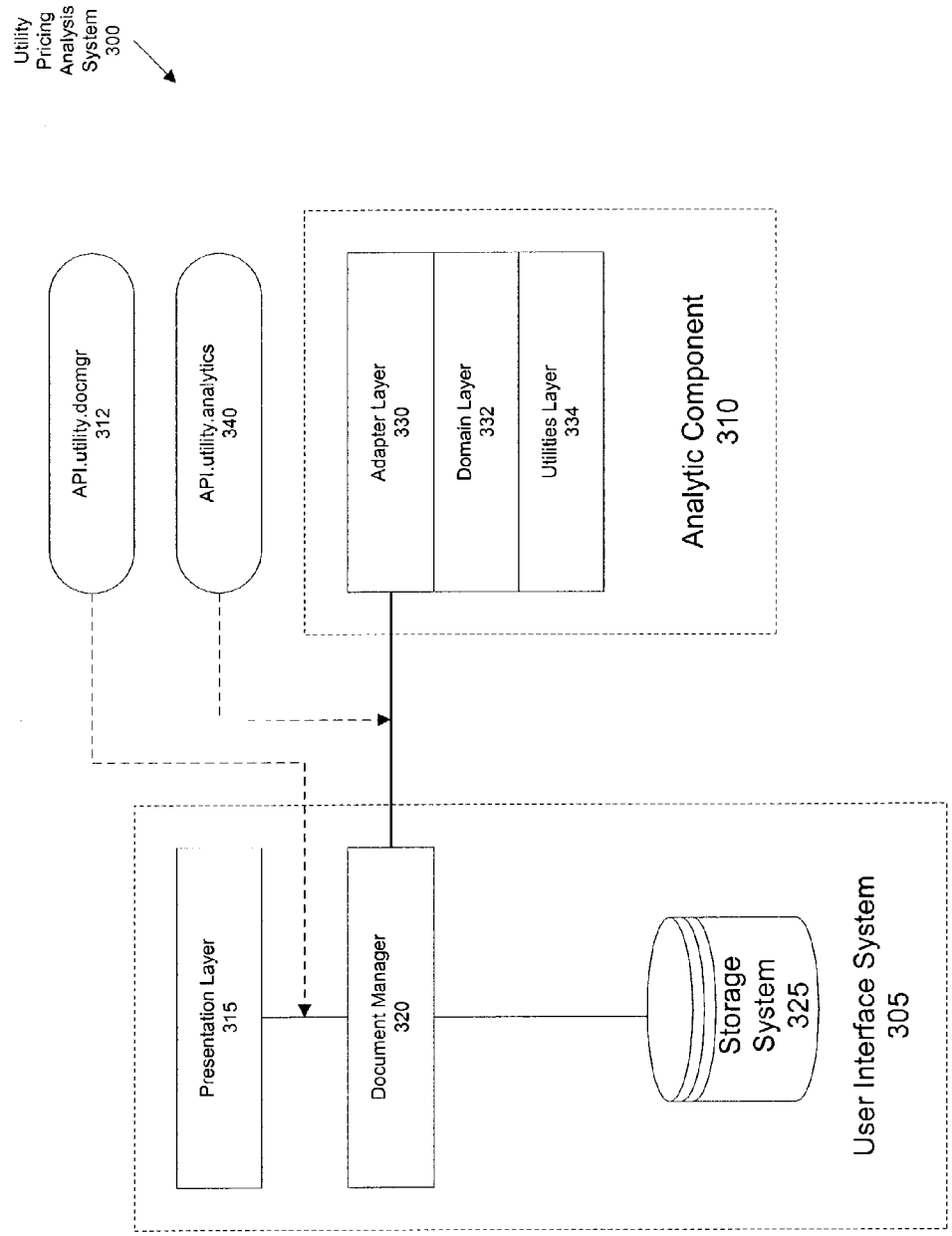
FIG. 3 is a block diagram illustrating a utility pricing analysis system according to the present invention.

FIG. 3 is a block diagram illustrating a utility pricing analysis system 300 according to the present invention. Utility pricing analysis system 300 includes a user interface system 305 and an analytic component 310. In the architecture depicted in FIG. 3, user interface system 305 includes a presentation layer 315, a document manager 320 and a storage unit 325. As its name implies, user interface system 305 provides a user interface front-end for the analysis performed within analytic component 310. Presentation layer 315 presents this standard, intuitive interface to the user, while document manager 320 handles the management of "documents" (information for use in analysis). The application programming interface (API) for the interface between these two modules is provided by an API.utility.docmgr 312, which allows a programmer to easily translate commands and information from a format understood by presentation layer 315 to a format understood by document manager 320. Document manager 320 communicates with storage unit 325, which is used to store the information used in the analysis performed by utility pricing analysis system 300.

In one implementation, analytic component 310 follows a three layer analytics architecture (e.g., the three layer analytics architecture from Rapt, Inc., of San Francisco, Calif.) that includes an adapter layer 330, a domain layer 332 and a utilities layer 334. Such an implementation can be programmed using, for example, the JAVA™ programming language. The various components of analytic component 310 are now described.

Adapter layer 330 can be situated in the package utility.analytics.adapter (as is depicted in FIG. 3 by API.utlity.analytics 340), for example. Adapter layer 330 is responsible for converting data structures between that which is used in the rest of the system (i.e., user interface system 305 or document manager 320) and that which is used by domain layer 332. It also provides a flat file interface for driving the analytics without a user interface (primarily for testing purposes.) The main class in this package is the UtilityEngineAdapter class. Typically, the only entry point to the analytics from document manager 332 is through a method referred to herein as a do_analysis( ) method. The do_analysis( ) method gathers the inputs defined in terms of the public API objects from API.utility.analytics.values (as is depicted in FIG. 3 by API.utlity.analytics 340), and sets the corresponding variables in the domain layer classes. The do_analysis( ) method then calls the main class in domain layer 332 (the UtilityEngine class) to run the requested analysis. The analysis is synchronous, so the adapter waits for the UtilityEngine to complete and then communicates the results back to document manager 320 through the API objects. The document manager/analytic engine interface is described more fully in the subsequent section entitled "An Example Design for Utility Pricing Analysis."

The flat file interface can be, for example, in a FlatFileReader class. Accepted inputs are in the associated "javadoc". The section below entitled "User Guide" describes examples of these inputs and their syntax.

Domain layer 332 is situated in the package utility.analytics.engine. It is responsible for solving the business problem at hand, in this case computing the expected revenue from a utility contract. The main class is the UtilityEngine class. The control flow entry point from the adapter layer is through the computeRevenue( ) method, however prior to this the adapter will have set input values in the helper classes: AdoptionProfile, Discount, PriceSchedule and Revenue. The adapter pulls results out from the Revenue class.

Utilities layer 334 is situated in several packages under analytics.quasi and analytics.numerical. Utilities layer 334 is purely mathematical and agnostic to the application. The Quasi-Monte Carlo implementation is in the quasi package. The numerical package contains classes for computing error functions, lognormal distributions, Cholesky factorization and numerical integration of arbitrary one dimensional functions. The ananlysis performed in utilities layer 334 is reflected in the analysis described earlier herein, as well as in subsequent sections which generalize this analysis.

User Guide

The analytic engine is situated in the package utility.analytics.engine. The adapter is situated in utility.analytics.adapter. To run the engine, one invokes the adapter UtilityEngineAdapter as:

% java utility.analytics.engine.UtilityEngineAdapter [-v] [-i filename]

where filename is a flat file containing the inputs for analysis.

In one embodiment, the program is capable of dealing with six types of input:
1. distribution type (typically LogNormal, although Normal can be supported).
2. interval type (typically one of Week, Month, Quarter, Year).
3. adoption profile
4. price list
5. discount
6. price anchor The format is to sandwich the input type between a start and end tag. The tags and format are as follows:
  starttag: StartDistribution
  body line: string defining distribution type ("Normal" or "LogNormal")
  endtag: EndDistribution
  starttag: StartIntervalType
  body line: string defining interval type ("Week", "Month", "Quarter", or "Year")
  endtag: EndIntervalType
  starttag: StartAdoptionProfile
  bodylines: mean loVal hiVal swing
  endtag: EndAdoptionProfile
  starttag: StartPriceList
  bodylines: usage price
  endtag: EndPriceList
  starttag: StartDiscount
  bodylines: discType discUsage discPeriod discAvging discThreshold discAmount
  endtag: EndDiscount
  starttag: StartAnchorType
  bodyline: anchorType ("Lease" or "Purchase")
  endtag: EndAnchorType
  starttag: StartAnchorAmount
  bodyline: anchorAmount
  endtag: EndAnchorAmount
  starttag: StartAnchorPercent
  bodyline: anchorPercent
  endtag: EndAnchorPercent
  starttag: StartOutputFilename
  bodyline: fileName
  endtag: EndOutputFilename
  starttag: StartSwingPercentile
  bodyline: swingVal
  endtag: EndSwingPercentile
  starttag: StartOutputThis
  bodyline: [Normalized] [Absolute]
  endtag: EndOutputThis The adoption profile is defined with the four parameters: mean, loVal, hiVal and swing, as described in the Model Estimation section above. There should be an entry for every billing period, as well as the contract start (i.e. billing period 0). The swing is percentile value with range (0,50).

The base price schedule is defined with the two parameters usage and price. The first entry in the price list is assumed to correspond to the initial usage value (i.e., $U_0$). Customers are billed at least for that usage regardless of an actual usage less than that.

Multiple discounts can be defined. However, each discount should be sandwiched in Discount tags. Also, only one discount type is typically allowed for any contract. Typically, discount types should not be mixed. The allowed types are Eternal, Fair or UseOrLose. The other parameters defining a discount are:
1. discUsage: the average usage required to qualify for the discount, $\tilde{U}_R$.
2. discPeriod: the billing period where the discount begins to apply, K.
3. discAvging: the number of previous billing periods to average for computing $\langle U \rangle_K$. Systems will always average from the first period, so this will always equal discPeriod in the integrated product.
4. discThreshold: the usage required to maintain the discount in subsequent periods, $\tilde{U}$.
5. discAmount: the amount to discount the base price, $\delta$.

Typically, only one adoption profile and one price list should be input per analysis, and input validation may be provided to avoid errors from flawed inputs.

The output is directed to standard out unless an output file is specified. The user can also specify an anchor amount and percentage. If none are specified, then it is assumed to be zero. Output is generated either as absolute (dollar values) or normalized by the anchor amount. The significant output is a series of tables showing the mean revenue and percentile bands as specified by the swing percentile.

An Example Design for Utility Pricing Analysis

This section describes the interface between a user interface system and the analytic engine described in the sections above, and describes the technical design for analyses in Utility Pricing. This section provides details on the interfaces used to send input to and receive output from the Utility analytic engine.

UtilityAnalysisRequestInterface

An example of an interface for a request to the analytic engine is described below. As can be seen, the interface UtilityAnalysisRequest is used to gather the parameters need to perform the analysis.

```
/**
 * Analysis request for Utility Pricing analyses.
 */
public interface UtilityAnalysisRequest extends Analysis
    Request {
    /**
     * Get the price schedule for this analysis request.
     *
     * @return The PriceSchedule for this analysis request.
     * @exception RaptException if an application error occurs
     * @exception RemoteException if a communication error
     *     occurs
     */
    public PriceSchedule getPriceSchedule( )
        throws RaptException, RemoteException ;
    /**
     * Get the adoption profile for this analysis request.
     *
     * @return The AdoptionProfile for this analysis request.
     * @exception RaptException if an application error occurs
     * @exception RemoteException if a communication error
     *     occurs
     */
    public AdoptionProfile getAdoptionProfile( )
        throws RaptException, RemoteException ;
    /**
     * Get the minimum payment schedule for this analysis
     *     request.
     *
     * @return The minimum payment schedule for this analysis
     *     request .
     * @exception RaptException if an application error occurs
```

```
 * @exception RemoteException if a communication error
     occurs
 */
public MinimumPayment getMinimumPaymentSchedule( )
     throws RaptException, RemoteException ;
/**
 * Get the discount schedule for this analysis request.
 *
 * @return The discount price schedule for this analysis
     request.
 * @exception RaptException if an application error occurs
 * @exception RemoteException if a communication error
     occurs
 */
public Discount getDiscountSchedule( )
     throws RaptException, RemoteException ;
/**
 * Get the capacity description descriptor for this analysis
 * request.
 *
 * @return the capacity descriptor for this analysis request.
 * @exception RaptException if an application error occurs
 * @exception RemoteException if a communications error
     occurs
 */
public CapacityDescriptor getCapacityDescriptor( )
     throws RaptException, RemoteException ;
/**
 * Get the interval descriptor descriptor for this analysis
 * request.
 *
 * @return the interval descriptor for this analysis request.
 * @exception RaptException if an application error occurs
 * @exception RemoteException if a communication error
     occurs
 */
public IntervalDescriptor getIntervalDescriptor( )
     throws RaptException, RemoteException ;
/**
 * Get the price model descriptor descriptor for this analysis
 * request.
 *
 * @return the price model descriptor for this analysis request.
 * @exception RaptException if an application error occurs
 * @exception RemoteException if a communications error
     occurs
 */
public PriceModelDescriptor getPriceModelDescriptor( )
     throws RaptException, RemoteException ;
/**
    * Get the anchor descriptor descriptor for this analysis
       request.
    *
    * @return the anchor descriptor for this analysis request.
    * @exception RaptException if an application error occurs
    * @exception RemoteException if a communications error
       occurs
    */
    public AnchorDescriptor getAnchorDescriptor( )
       throws RaptException, RemoteException ;
/**
    * Get the swing percentile for this analysis request.
    *
    * @return the swing percentile for this analysis request.
    * @exception RaptException if an application error occurs
    * @exception RemoteException if a communications error
       occurs
    */
    public SwingPercentile getSwingPercentile( )
       throws RaptException, RemoteException ;
}
```

UtilityAnalysisResponse interface

An example of an interface for a response from the analytic engine is described below. As can be seen, the interface UtilityAnalysisResponse is used to provide the results of the analysis.

```
/**
 * Analysis response for Utility Pricing analyses.
 *
 */
public interface UtilityAnalysisResponse extends
AnalysisResponse {
    /**
     * Get the anchor revenue for the corresponding
     * AnalysisRequest.
     *
     * @return The AnchorRevenue for the corresponding
     * Analysis Request
     * @exception RaptException if an error occurs
     */
    public AnchorRevenue getAnchorRevenue( )
       throws RaptException, RemoteException ;
    /**
     * Get the percentile revenue for the corresponding
     * AnalysisRequest.
     *
     * @return The PercentileRevenue for the
     * corresponding AnalysisRequest
     * @exception RaptException if an error occurs
     */
    public PercentileRevenue getPercentileRevenue( )
       throws RaptException,
RemoteException ;
}
```

AnalysisDispatcher interface

An example of an Analysis Dispatcher is described below. As can be seen, the Analysis Dispatcher is an encapsulator for the computational services provided by the analytic engines.

```
/**
 * Analysis Dispatcher--Encapsulator for the
 * computational services provided by the
 * analytic engines.
 */
public interface AnalysisDispatcher extends Remote {
    /**
     * Process an analysis request in a synchronous manner.
     * The caller waits while this analysis completes and uses
     *   the AnalysisResponse instance returned by this
         method
     * to get the results for the analysis.
     *
     * @param request the analysis request containing
     * the inputs to process.
     * @return the analysis response to be used to retrieve the
     * analysis results.
     * @exception RaptException for Rapt-specific errors.
     * @exception RemoteException for a communications
         error.
     */
    public AnalysisResponse processRequest (AnalysisRequest request)
       throws RaptException, RemoteException ;
}
```

Database Schema

In this sub-section, example schema are provided for a database that can hold the information needed for performing the analytical calculations associated with a utility pricing analysis according to the present invention.

b_analysis

Analyses across all planning environments.

| Field | Type | Length | Nullable | Unique | Foreign table | Foreign name |
|---|---|---|---|---|---|---|
| Id | Integer | | NOT NULL | | | |
| planning_environment_id | Integer | | NOT NULL | | b_planning_environment | id |
| Folio_id | Integer | | NOT NULL | true | b_folio | id |
| scenario_id | Integer | | NOT NULL | | b_scenario | id |
| Name | user_specified_name | | NOT NULL | true | | |
| process_status | Character | 1 | NOT NULL | | | |
| analysis_type | Character | 1 | NOT NULL | | | |
| is_dirty | Boolean | | NOT NULL | | | |
| Description | Description | | NULL | | | |
| creation_time | Timestamp | | NOT NULL | | | |
| Last_modification_time | Timestamp | | NOT NULL | | | |
| Error | character_stream | | NULL | | | |

Consistency checks

Creation time is before last modification time

Both folios and analyses belong to planning environments—they must belong to the same PE b_analysis_revenue Revenue Analyses across all planning environments

| Field | Type | Length | Nullable | Unique | Foreign table | Foreign name |
|---|---|---|---|---|---|---|
| analysis_id | integer | | NOT NULL | | b_analysis | id |
| plan_id | integer | | NOT NULL | | b_plan | id |
| Swing | float | | NOT NULL | | b_plan | id |
| Use_actuals | boolean | | NULL | | | | b_analysis_plan_comparison

Plan Comparison Analyses across all planning environments

| Field | Type | Length | Nullable | Unique | Foreign table | Foreign name |
|---|---|---|---|---|---|---|
| analysis_id | integer | | NOT NULL | | b_analysis | id |
| plan_id | integer | | NOT NULL | | b_plan | id | b_analysis_revenue_output

Output for revenue analysis.

| Field | Type | Length | Nullable | Unique | Foreign table | Foreign name |
|---|---|---|---|---|---|---|
| analysis_id | integer | | NOT NULL | | b_analysis | id |
| interval_number | integer | | NOT NULL | | | |
| anchor_revenue | money | | NOT NULL | | | |
| anchor_npv | money | | NOT NULL | | | | b_analysis_percent_rev_output

Percentile bands for revenue for the specified plan and scenario.

| Field | Type | Length | Nullable | Unique | Foreign table | Foreign name |
|---|---|---|---|---|---|---|
| analysis_id | integer | | NOT NULL | true | b_analysis | id |
| interval_number | integer | | NOT NULL | true | | |
| percentile | float | | NOT NULL | true | | |
| revenue | money | | NOT NULL | | | |
| npv | money | | NOT NULL | | | | b_plan_comparison_output

Common output for plan comparison output

| Field | Type | Length | Nullable | Unique | Foreign table | Foreign name |
|---|---|---|---|---|---|---|
| analysis_id | integer | | NOT NULL | | b_analysis | id |
| interval_number | integer | | NOT NULL | | | |
| avg_usage | float | | NOT NULL | | | | b_plan_comparison_rev_output

Revenue and NPV output for a plan and interval.

| Field | Type | Length | Nullable | Unique | Foreign table | Foreign name |
|---|---|---|---|---|---|---|
| analysis_id | integer | | NOT NULL | | b_analysis | id |
| plan_id | integer | | NOT NULL | | b_plan | id |
| interval_number | integer | | NOT NULL | | | |
| revenue | money | | NOT NULL | | | |
| npv | money | | NOT NULL | | | |

An Example of Generalized Utility Pricing

This section describes the generalization of the mathematical model described in "Utility Analytics" to the case where pricing is multidimensional and consumption is hierarchical. For example, consider usage based pricing of messaging with multiple service levels. The price is a function of the number of messages and the service level. Furthermore, the "consumption" of messages can place additional provisioning burdens on the service provider in terms of CPUs, storage, network bandwidth, possible software licensing costs (if the messaging software is licensed based on number of CPUs) and other such overhead. This provisioning problem can be solved through demand statistical arbitrage.

As noted, for the purposes of the present invention, a usage-based pricing methodology, also referred to herein as a pricing algorithm, refers to a schedule of prices that depends on a user's utilization of a device as measured by one or more metrics. A device refers to any hardware resource or software application. For a given device, and for each applicable metric, the capacity of that metric refers to the maximum metric output of the device. The device may be resident with the user in which acse any excess metric capacity is not utilized by the user and remains idle. Alternatively, the device may reside with the device provider, in which case idle device capacity may be consumed by other users.

The present invention provides techniques that 1) compute the expected net present value (NPV) of a pricing algorithm and the variance around that value; 2) computes the upside and downside risks of a pricing algorithm; 3) provides updates of the values in (1) and (2) as new customer usage data becomes available; 4) given a target NPV, determines the pricing algorithm that minimizes the variance; 5) given a target variance on the NPV, determines the pricing algorithm that maximizes the expected NPV; 6) computes the expected NPV and variance of a portfolio of devices that may be in different stages of their usage lifecycle and that may differ in pricing algorithms used; and 7) given a target aggregate NPV for the portfolio, dynamically adjusts the pricing algorithms to minimize the portfolio variance.

IT Services Model

Let $X=\{1,\ldots,n\}$ denote the set of services, and $i \in X$ index this set. Note that a single customer may deploy multiple services. Furthermore, note that usage of these services may be correlated positively or negatively. Let $x_t i$ denote the usage of service i at time t. (For this report, we assume a predefined choice of service units.) Let $S_t$ denote the covariance matrix for the n services at time t. When the covariance matrix is not time dependent, the subscript t is dropped. For the n set of services, let $y_{t1}, \ldots, y_{tm}$ denote the quantity of the m set of hardware, software, network, and other components necessary for delivering that service at time t. Lastly, for service i and component j, let $a_t$, ij denote the connect rate, that is the jth component requirement for delivering one unit of service i. Note that these connect rates may be time dependent to model component transitions in providing the service. $A_t$ denotes the m×n connect rate matrix and note that $$A_t \cdot x_t - y_t < 0 \qquad (2.1)$$

is required to ensure that the hardware provisioning at time t supports service demands $x_t$ at time t.

An example can now be created. Customer X requires a messaging application, application web hosting, and a general purpose server. The first two services are delivered as a software products that require a server, storage device and network components. The last service is a hardware product. The connect rates for the hardware requirements will depend on the hardware products, the IT architecture and other variables. Each hardware product can itself have a bill-of-material that specifies its configuration. For example, the server used for the web hosting may be configured with 500 MHz CPUs and an upgrade to 750 MHz CPUs offered in 6 months. The CPU upgrade will naturally change the connect rates between the web application service and its server support.

Stochastic Model for Services—Independent Demand

Having introduced the basic IT service model introduce a model for the demand of services over some predefined period of time. begin with a general Markov model defined for the n×1 vector of services $x_t$, $$dx_t = \mu(x_t, t|\theta)dt + \Lambda(x_t,t|\zeta)Vdz_t, \qquad (3.1)$$

where $\mu(x_t, t|\theta)$ denotes the drift term of the vector stochastic process and the n×k matrix $\Lambda(x_t, t|\zeta)V$ denotes the volatility term. $\theta$ and $\zeta$ denote parameters for the functional forms of these terms. V is a constant n×k matrix, and $\Lambda(x_t, t|\zeta)$ is a diagonal n×n matrix with diagonal elements $\sigma_i(x_t, t|\zeta)$. The process $dz_t$ denotes a standard k-dimensional Wiener process. For any given dimension we have that $$z_{t+\Delta t,i} - z_{ti} = \epsilon_{ti}\sqrt{\Delta t},$$

where $\epsilon_{ti} \sim \mathcal{N}(0,1)$ is normal with mean zero and unit variance. Furthermore, $E[\epsilon_{ti}\epsilon_{t'3}]=0$ for $t \neq t'$ or $i \neq j$, suggesting that the $\epsilon_{t2}$ are independent and serially uncorrelated.

Observe that the covariance of the vector stochastic process defined in Equation 3.1 is given by $$S_t = \Lambda V V' \Lambda' dt \qquad (3.2)$$

where we have suppressed the dependence on $x_t$ and t in the volatility terms. But the covariance of the n services is given by $\Sigma_t = \Lambda R \Lambda'$, where R is the correlation matrix of the n services. We assume that the correlation matrix is time independent across the servcies, but we let the variances vary over time. Thus, we get that VV' is the principal component decomposition of the correlation matrix R that maintains the first k components.

In the special case where the services are uncorrelated, V is the diagonal matrix, and $\sigma_i^2(x_t, t|\zeta)$ denotes the volatility of the ith service. Observe, that when the services are uncorrelated, we need a full n-dimensional representation of the correlation matrix and noise terms.

Discretization of the Stochastic Process

Using an Euler discretization of Equation 3.1

$$x_{t+\Delta t} = x_t + \mu(x_t, t|\theta)\Delta t + \Lambda(x_t, t|\zeta) V \epsilon_{t+\Delta t} \sqrt{\Delta t}, \qquad (3.3)$$

where $\epsilon_{it+\Delta t} \sim \mathcal{N}(0,1)$ for $t=0, \ldots, T-\Delta t$.

Transition Function of the Stochastic Process

The transition functions of the stochastic process are essential for using maximum likelihood estimation (ML) of the parameters. We can approximate transition probabilities to general stochastic process by using the Euler discretization. This introduces error proportional to $\Delta t$, the size of the discretization interval.

Observe that we have assumed a deterministic functional form for the drift and the volatility terms. In general, we may also choose to model these as stochastic processes. Modelling one, or both, of these terms as a stochastic process leads to a two, or three, factor model. These models are typically estimated using filtering techniques. For now we will simply assume that the drift and volatility follow a parametric functional form.

Gaussian

When the volatility term does not depend on the state variables $x_t$, the process becomes a Gaussian model. In this case, the transition function of the difference, $f(x_{t+\Delta t} - x_t | x_t, \theta, \zeta)$, is a multivariate normal distribution with conditional mean and covariance defined by $$E[x_{t+\Delta t} - x_t | x_t] = \mu(x_t, t|\theta)\Delta t$$

$$V[x_{t+\Delta t} - x_t | x_t] = \Lambda(t|\zeta) VV' \Lambda'(t|\zeta) \Delta t.$$

We observe that the trajectory of the mean is given by $\mu(x_t, t|\theta)\Delta t$. Specification of this trajectory may be deterministic or stochastic. In the former case, we may choose, for example, to specify the trajectory as a Bass model fitted to observed data.

The volatilities in this model are captured in the variance terms $\sigma_i^2(t|\zeta)$ that appear on the diagonal of the $\Lambda(t|\zeta)\Lambda'(t|\zeta)$ matrix. If these variances are not time dependent, then the model is homoscedastic. In general, the variances will vary over time, defining a hetroscedastic model. The model for the time dependence of the variance can be deterministic or stochastic. The variances may be deterministically specified exogenously through historical data or user input. Alternatively, we may employ a GARCH model or a stochastic diffusion model to model the time dependence of the variances.

Example

In this simplest case, the user may specify a time series of mean and variance terms for the cumulative usage of utility over some period of time T. Assume that the n services are uncorrelated and that we use all n principal components in the model. Let $u_0, \ldots, u_T$, and $s_0, \ldots, s_T$, denote the cumulative mean usage and standard deviation of usage specified by the user for the ith service. We can solve for the drift and volatility terms in the Gaussian model as follows:

$$\mu_{ti} = u_{t+1,i} - u_{ti}$$

$$\sigma_{ti} = x_{ti}.$$

Lognormal Models

We consider lognormal models as a variation of the Gaussian model. We thus get for state variable i, $$\frac{dx_{ti}}{x_{ti}} = \mu_i(t|\theta)dt + \Lambda(t|\zeta)V dz_t,$$

which gets discretized as $$lnx_{t+\Delta t,i} = lnx_{ti} + \mu_i(t|\theta)dt + \Lambda(t|\zeta)V dz_t. \quad (3.5)$$

The transition function for the difference of logarithms, $f(lnx_{t+\Delta t} - lnx_t | lnx_t, \theta, \zeta)$, has conditional mean and covariance given by $$E[lnx_{t+\Delta t} - lnx_t | x_t] = \mu(x_t, t|\theta)\Delta t$$

$$V[lnx_{t+\Delta t} - lnx_t | x_t] = \Lambda(t|\zeta)VV'\Lambda'(t|\zeta)\Delta t.$$

Thus, we observe that the transition function for the difference of logarithms is multivariate normal with time dependent mean and covariance.

Stochastic Model for Service IT Infrastructure—Dependent Demand

The dependent demand of the IT service model is the BOM demand created for the supporting hardware and software infrastructure. We can use Equation 2.1 to transform the independent services demand $x_t$ into the dependent demand $y_t = A_t x_t$. Because we are modelling $y_t$ dependent on the services requirements $x_t$, the matrix $A_t$ can capture disjunctive relationships across components that are needed, for example, in component lifecycle transitions.

Example

Consider service $x_1$ with two components $y_1$ and $y_2$. Assume that $x_1$ requires either $a_{11} y_1$ or $a_{12} y_2$. Because we are using dependent demand we must actually specify the split across $y_1$ and $y_2$. Let $\alpha$ and $1-\alpha$ denote the split across the two components. Thus, we get that $$y_1 = \alpha a_{11} x_1$$

$$y_2 = (1-\alpha) a_{12} x_1.$$

If we assume that $y_2$ is a component upgrade of $y_1$, then can model the lifecycle transition by making the mix coefficient $\alpha$ time dependent. Thus, $\alpha$ starts at 1 and goes to zero as the components or hardware get upgraded. Multilevel BOMs can be similarly modelled by composition of the matrices while reporting back the dependent demand for all intermediary results.

Model Estimation and Update

We explore model estimation using maximum likelihood (ML) and model update using filtering or Bayesian methods. Estimation of the parameters in the model refers to fitting the drift and the volatilities to data. We first discuss the several choices of data inputs.

Data Inputs

There are generally two different data types and each will lead to different methods of estimation.

Drift and Volatility Data

The first data type consists of data on the drift and volatility terms of the model. For example, the user may specify a time series of mean service usage and the corresponding variances. Thus, for a contract of length T we could have a time series of means and variances, $\mu_0, \ldots, \mu_T$ and $v_0^2, \ldots, \sigma_T^2$ respectively. Observe that this specification assumes that the volatility is fully captures by the second moment and hence must be normal or lognormal. This form of data specification will be commonly used when no historical data is available. The data inputs will be largely based on judgement.

Users may well specify the percentile bands of usage. For example, the user may specify $\zeta_0^K, \ldots, \zeta_T^K$, for K equal to the 10th, 25th, 50th, 75th, and 90th percentile. Observe that unless the distribution is symmetric, the 50th percentile is the mode and does not correspond to the mean. In that case, the user may choose to specify the mean directly instead of the 50th percentile band. When percentiles are specified, then we assume that either the percentiles at any time point arise from a normal distribution or from a lognormal distribution. In either case, we estimate first and second moments directly from the percentiles and use either the Gaussian model or the lognormal model.

Service Utilization Data

The second type of data is data based on directly observed usage of the services. We differentiate between two categories of usage data. The first category includes sparse usage data. Sparse usage data consists of, for example, 1 to 5 sets of observations. The second consists of dense usage data. In either case, this type of data input differs from the first data category in that the data corresponds specifically to the service usages $x_t$ and not to the drift and volatility terms of the model.

Maximum Likelihood Estimation

Observe that to use ML estimation methods we need to have defined transition functions. In general, we cannot obtain exact transition function probabilities from the stochastic model equations. Instead, we approximate the transition functions by discretizing the stochastic models as in Equation 3.3. This approach, known as Quasi-maximum likelihood (QML) is sufficient for fast approximate estimations. More refined and accurate estimations can be achieved through simulated maximum likelihood. For now we will discuss the QML approach and defer the simulated ML approach.

Estimation from Drift and Volatility Data

When drift and volatility data is available, we have two alternatives. In the first alternative, we can employ that data directly to specify $\mu_t$ and $\sigma_t$. In this case, no estimation is necessary since the model is fully specified by the data. Alternatively, if the drift and volatility expressions have parametric forms, for example, $\mu(t|\theta)$ and $\Lambda(t|\zeta)$, then we can use parametric estimation procedures to estimate the parameters $\theta$ and $\zeta$ that are consistent with the data.

Estimation from Service Utilization Data

Each service utilization data series provides a maximum likelihood estimate of the drift and volatility parameters $\theta$ and $\zeta$. Thus, from multiple data realizations we can computer a distribution of these parameters, and the distributions associated moments. We let f(θ/Ω) and f(vzeta/Ω) denote the distributions for these parameter vectors conditional on the observations $\Omega=\{(w_o^i, \ldots, w_T^i): i \in |N|\}$ that contains N observational series of length T. In providing a pricing algorithm for a new contract, we use these distributions as prior probability estimates of the drift and volatility parameters. Note that if we also have access to a utility function, then we can choose the initial model parameters as those that maximize the expected utility.

Bayesian Update

As we collect actual utilization data for the services, we can update the parameter estimates. Regardless of the choice of initial data set, we can compute an MLE of drift and volatility parameters from the new data samples. These new estimates can be used to update the original prior parameter distributions if they existed.

Pricing Algorithms

Thus far we have modelled each service by a single time dependent random variable. That variable represents some chosen metric representative of service consumption. In general, a single service may have an arbitrary number of acceptable consumption metrics. For example, a server my be monitored by total CPU utilization, memory utilization, storage consumption, etc. For the ith service, let $x_t^1, \ldots, x_{ti}^K$ denote the $K \geq 1$ metrics that are representative of its consumption. We assume that these K metrics are not functional transformations of each other (for example, MB and GB for storage). Each metric is modelled by a stochastic diffusion model, noting that these metrics will be highly correlated.

The pricing algorithm consists of an arbitrary algorithm that transforms the set of service metrics into a revenue number. We may choose to have a pricing algorithm for each service that takes as input all the monitored service metrics and converts them into a price, or we may price an portfolio of services that takes as inputs all monitored metrics for all delivered services. We will discuss in this report an even simpler version of the pricing algorithm. This version takes as input an aggregation of the service metrics into a single metric.

Aggregation of Service Metrics

We let $h_\tau$ denote the scalar valued utility function that maps the K metric values into a single scalar value that can be used in the pricing algorithms. The function h may also aggregate the metrics into a coarser time scale. Thus, letting $x_{ti} = (x_{ti}^1, \ldots, x_t^K)$, we have that $$w_\tau = h_\tau(x_{t_1i}, \ldots, x_{t_Li}), \quad (6.1)$$

where τ indexes the coarser time scale, and $t_1, \ldots, t_L \in \tau$. Note that we have allowed the utility function $h_t$ to depend on τ for maximum generality. In most applications, however, we do not expect the utility function to change over the contract period for the rendered service.

Example

Consider a single service metric such as number of CPUs utilized in an N-way server. Suppose that an event is triggered and stored every time the number of active CPUs changes. We first need to transform the nonuniform event samples into uniform samples. Consider taking the daily maximum number of CPUs. That sequence defines the service metric $x_t$ where t is a daily index. Examples of utility functions include 1) the monthly mean of the $x_t$; 2) the 75th percentile of the monthly distribution of the $x_t$; 3) the maximum of $x_t$ and F for some floor usage F; 4) a weekly weighted mean of the daily usages where weekends are weighted differently from weekdays; 5) $x_t$ itself.

Observe that in the first four examples, the daily service sampling was transformed into a coarser sample such as weekly or monthly.

Single Metric Pricing Algorithm

Let $w_\tau = (w_1, \ldots, w_\tau)$ denote the aggregated utilization of a given service up to time τ. We define a general single metric pricing algorithm, $Z(\Omega_\tau | w_{\tau-1})$ that maps metric usage at time τ into a positive real number. We assume that the pricing algorithm is a deterministic function, although we can conceive of a randomized policy pricing algorithm and deploy the same methods. Furthermore, the pricing algorithm may be a function of historical usage $w_{\tau-1}$.

Example

We consider the following pricing algorithm example. Let $f_\tau$ denote a floor level of utilization and let $c_\tau$ denote the ceiling level of utilization. Note that $c_\tau$ will depend on the capacity of the IT infrastructure installed to support the service. For example, given a one time installation, then $c_\tau = c$ and is time independent.

Let R denote a rate schedule such that for a given usage level $w_\tau$, we get that $R(w_\tau)$ defines the incurred rate. The pricing algorithm is now defined as $$A(w_\tau) = R(\min[c_\tau, \max[w_\tau, f_\tau]]). \quad (6.2)$$

Observe that this pricing algorithm requires the customer to pay for a time-dependent floor level of utilization even if actual utilization falls below the floor. In addition, the customer can at most pay for the available ceiling level of utilization since the supporting IT infrastructure cannot deliver in excess of that ceiling.

Cost Analysis

We have thus far captured the revenue generated by the service oriented model. We must now consider the cost incurred in delivering that service. We have previously discussed the dependent demand of the supporting IT infrastructure. Several methods exist to deliver that infrastructure support. For example, the delivery may consist of a single initial hardware installation. Alternatively, the installation may consist of stage hardware installations that provide additional utilization capacity. Lastly, the hardware may undergo technology upgrades to provide faster processing speeds, for example.

Financial Metrics

Let $F_t = F(x_t, t\backslash A, C)$ denote a financial metric such as revenue or margin, that is determined from a service utilization quantity x and the implicit pricing algorithm A and cost structure C. Because the underlying process x is a Wiener process, we need to use Ito's Lemma to compute the value of $dF_t$. This gives us $$dF_t = \left(\frac{\partial F}{\partial t} + \nabla F \cdot \mu\left(x_t, t|\theta\right) + \frac{1}{2}V'\Lambda(x_t, t|\zeta)H(F)\Lambda(x_t, t|\zeta)V\right)dt + \nabla'F\Lambda(x_t, t|\zeta)Vdz_t,$$

where nablaF is the gradient of F with respect to $x_t$ and H(F) is the Hessian of F with respect to $x_t$.

Alternatively, it is preferable to use the Monte Carlo simulation runs of the underlying service variables $x_t$ to directly estimate $F_t$ on each run. In general, the financial metrics will typically be computed on a coarser time scale than the sampling interval. As before, we can let $w_\tau = h(x_{t_1}, \ldots, w_{t_L})$ denote an aggregation function h over a window of length L. Thus, we must use the financial metric $F_t = F(w_\tau, t\backslash A, C)$ over the aggregated interval.

An Example Computing and Network Environment

Figure 4:
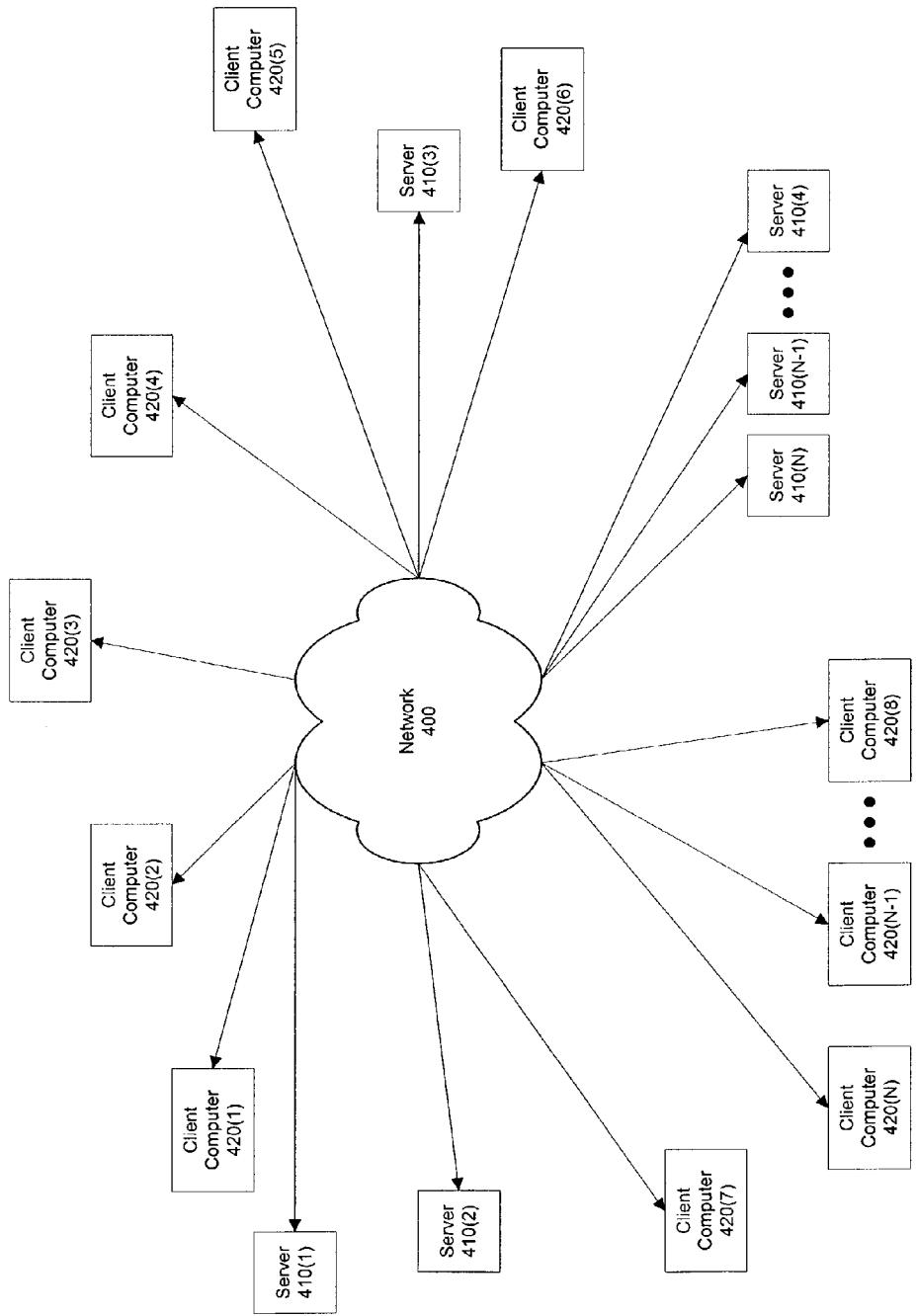
FIG. 4 is a block diagram illustrating a network environment in which commercial transaction processing according to embodiments of the present invention may be practiced.

FIG. 4 is a block diagram illustrating a network environment in which a system according to the present invention may be practiced. As is illustrated in FIG. 4, network 400, such as a private wide area network (WAN) or the Internet, includes a number of networked servers 410(1)-(N) that are accessible by client computers 420(1)-(N). Communication between client computers 420(1)-(N) and servers 410(1)-(N) typically occurs over a publicly accessible network, such as a public switched telephone network (PSTN), a DSL connection, a cable modem connection or large bandwidth trunks (e.g., communications channels providing T1 or OC3 service). Client computers 420(1)-(N) access servers 410(1)-(N) through, for example, a service provider. This might be, for example, an Internet Service Provider (ISP) such as America On-Line™, Prodigy™, CompuServe™ or the like. Access is typically had by executing application specific software (e.g., network connection software and a browser) on the given one of client computers 420(1)-(N).

One or more of client computers 420(1)-(N) and/or one or more of servers 410(1)-(N) may be, for example, a computer system of any appropriate design, in general, including a mainframe, a mini-computer or a personal computer system. Such a computer system typically includes a system unit having a system processor and associated volatile and non-volatile memory, one or more display monitors and keyboards, one or more diskette drives, one or more fixed disk storage devices and one or more printers. These computer systems are typically information handling systems which are designed to provide computing power to one or more users, either locally or remotely. Such a computer system may also include one or a plurality of I/O devices (i.e., peripheral devices) which are coupled to the system processor and which perform specialized functions. Examples of I/O devices include modems, sound and video devices and specialized communication devices. Mass storage devices such as hard disks, CD-ROM drives and magneto-optical drives may also be provided, either as an integrated or peripheral device. One such example computer system, discussed in terms of client computers 420(1)-(N) is shown in detail in FIG. 5.

It will be noted that the variable identifier "N" is used in several instances in FIG. 4 to more simply designate the final element (e.g., servers 410(1)-(N) and client computers 420(1)-(N)) of a series of related or similar elements (e.g., servers and client computers). The repeated use of such variable identifiers is not meant to imply a correlation between the sizes of such series of elements, although such correlation may exist. The use of such variable identifiers does not require that each series of elements has the same number of elements as another series delimited by the same variable identifier. Rather, in each instance of use, the variable identified by "N" may hold the same or a different value than other instances of the same variable identifier.

Figure 5:
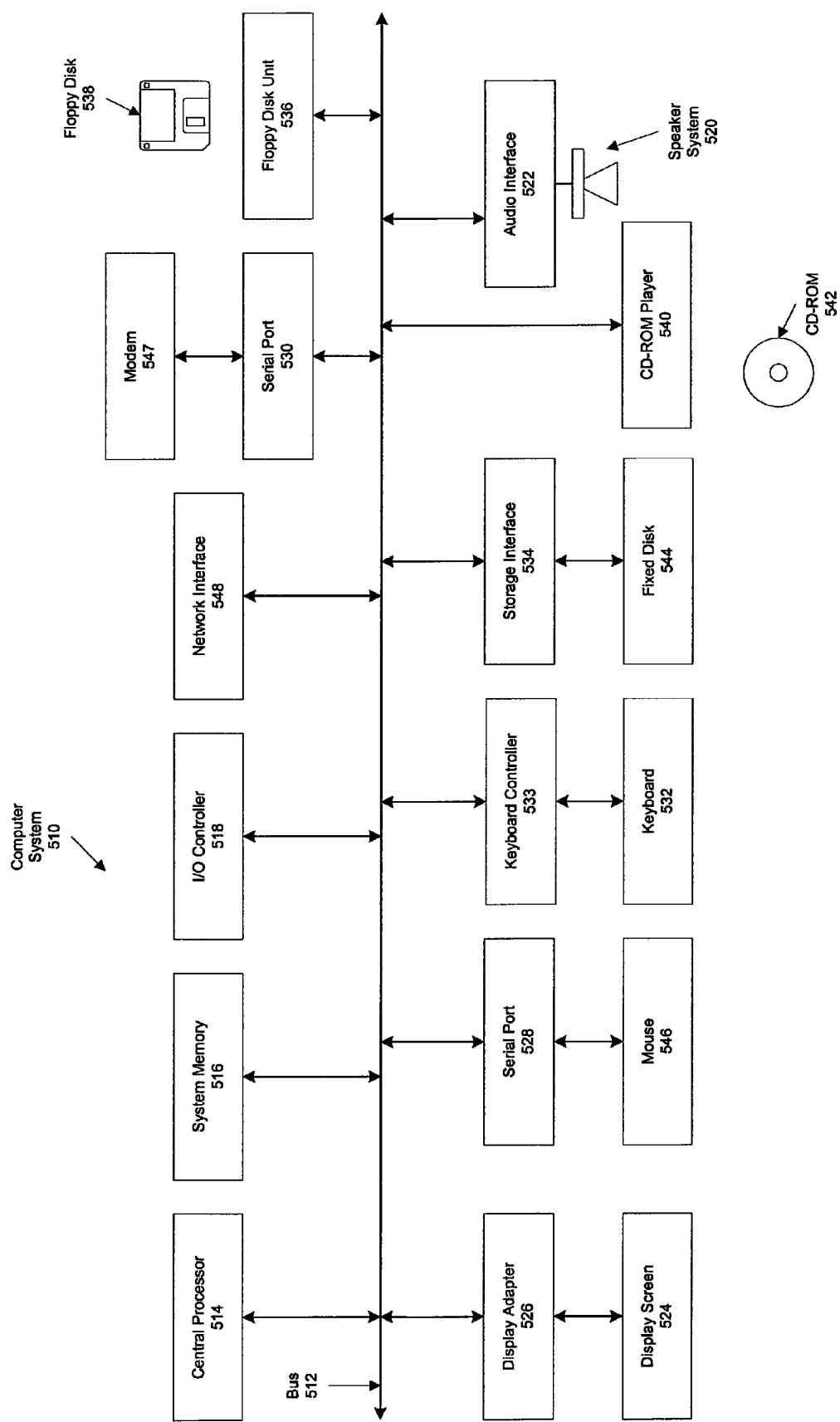
FIG. 5 is a block diagram illustrating a computer system suitable for implementing embodiments of the present invention.

FIG. 5 depicts a block diagram of a computer system 510 suitable for implementing the present invention, and example of one or more of client computers 420(1)-(N). Computer system 510 includes a bus 512 which interconnects major subsystems of computer system 510 such as a central processor 514, a system memory 516 (typically RAM, but which may also include ROM, flash RAM, or the like), an input/output controller 518, an external audio device such as a speaker system 520 via an audio output interface 522, an external device such as a display screen 524 via display adapter 526, serial ports 528 and 530, a keyboard 532 (interfaced with a keyboard controller 533), a storage interface 534, a floppy disk drive 536 operative to receive a floppy disk 538, and a CD-ROM drive 540 operative to receive a CD-ROM 542. Also included are a mouse 546 (or other point-and-click device, coupled to bus 512 via serial port 528), a modem 547 (coupled to bus 512 via serial port 530) and a network interface 548 (coupled directly to bus 512).

Bus 512 allows data communication between central processor 514 and system memory 516, which may include both read only memory (ROM) or flash memory (neither shown), and random access memory (RAM) (not shown), as previously noted. The RAM is generally the main memory into which the operating system and application program are loaded and typically affords at least 46 megabytes of memory space. The ROM or flash memory may contain, among other code, the Basic Input-Output system (BIOS) which controls basic hardware operation such as the interaction with peripheral components. Applications resident with computer system 510 are generally stored on and accessed via a computer readable medium, such as a hard disk drive (e.g., fixed disk 544), an optical drive (e.g., CD-ROM drive 540), floppy disk unit 536 or other storage medium. Additionally, applications may be in the form of electronic signals modulated in accordance with the application and data communication technology when accessed via network modem 547 or interface 548.

Storage interface 534, as with the other storage interfaces of computer system 510, may connect to a standard computer readable medium for storage and/or retrieval of information, such as a fixed disk drive 544. Fixed disk drive 544 may be a part of computer system 510 or may be separate and accessed through other interface systems. Many other devices can be connected such as a mouse 546 connected to bus 512 via serial port 528, a modem 547 connected to bus 512 via serial port 530 and a network interface 548 connected directly to bus 512. Modem 547 may provide a direct connection to a remote server via a telephone link or to the Internet via an internet service provider (ISP). Network interface 548 may provide a direct connection to a remote server via a direct network link to the Internet via a POP (point of presence). Network interface 548 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., bar code readers, document scanners, digital cameras and so on). Conversely, it is not necessary for all of the devices shown in FIG. 5 to be present to practice the present invention. The devices and subsystems may be interconnected in different ways from that shown in FIG. 5. The operation of a computer system such as that shown in FIG. 5 is readily known in the art and is not discussed in detail in this application. Code to implement the present invention may be stored in computer-readable storage media such as one or more of system memory 516, fixed disk 544, CD-ROM 542, or floppy disk 538. Additionally, computer system 510 may be any kind of computing device, and so includes personal data assistants (PDAs), network appliance, X-window terminal or other such computing device. The operating system provided on computer system 510 may be MS-DOS®, MS-WINDOWS®, OS/2®, UNIX®, Linux® or other known operating system. Computer system 510 also supports a number of Internet access tools, including, for example an HTTP-compliant web browser having a JavaScript interpreter, such as Netscape Navigator® 6.0, Microsoft Explorer® 6.0 and the like.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

The foregoing described embodiment wherein the different components are contained within different other components (e.g., the various elements shown as components of computer system 510). It is to be understood that such depicted architectures are merely examples, and that in fact many other architectures can be implemented which achieve the same functionality. In an abstract, but still definite sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermediate components. Likewise, any two components so associated can also be viewed as being "operably connected", or "operably coupled", to each other to achieve the desired functionality.

Figure 6:
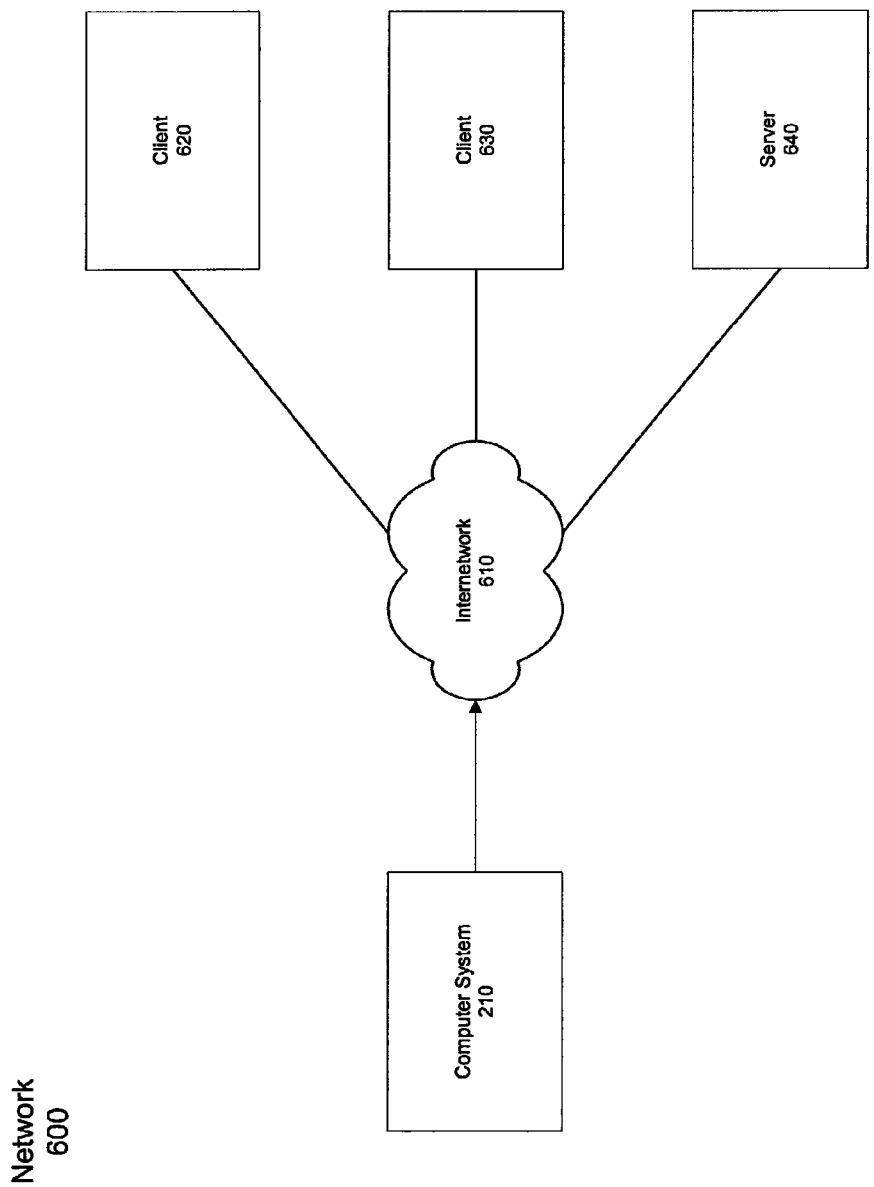
FIG. 6 is a block diagram illustrating the interconnection of the computer system of FIG. 5 to client and host systems.

FIG. 6 is a block diagram depicting a network 600 in which computer system 510 is coupled to an internetwork 610, which is coupled, in turn, to client systems 620 and 630, as well as a server 640. Internetwork 610 (e.g., the Internet) is also capable of coupling client systems 620 and 630, and server 640 to one another. With reference to computer systems 510, modem 547, network interface 548 or some other method can be used to provide connectivity from computer system 510 to internetwork 610. Computer system 510, client system 620 and client system 630 are able to access information on server 640 using, for example, a web browser (not shown). Such a web browser allows computer system 510, as well as client systems 620 and 630, to access data on server 640 representing the pages of a website hosted on server 640. Protocols for exchanging data via the Internet are well known to those skilled in the art. Although FIG. 6 depicts the use of the Internet for exchanging data, the present invention is not limited to the Internet or any particular network-based environment.

Referring to FIGS. 4, 5 and 6, a browser running on computer system 510 employs a TCP/IP connection to pass a request to server 640, which can run an HTTP "service" (e.g., under the WINDOWS® operating system) or a "daemon" (e.g., under the UNIX® operating system), for example. Such a request can be processed, for example, by contacting an HTTP server employing a protocol that can be used to communicate between the HTTP server and the client computer. The HTTP server then responds to the protocol, typically by sending a "web page" formatted as an HTML file. The browser interprets the HTML file and may form a visual representation of the same using local resources (e.g., fonts and colors).

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Furthermore, it is to be understood that the invention is solely defined by the appended claims.

What is claimed is:

1. A method in a computer for providing a pricing algorithm for a device, the device being a hardware resource or a software application, comprising:
   receiving by the computer estimates of service usage for the device including a history of past usage of the device;
   receiving by the computer a usage-based schedule of prices for the device; and
   in response to the receiving the estimates of service usage and the receiving the schedule of prices:
      calculating by the computer a model volatility of service usage relating to statistical variation in expected service usage of the device, the calculating of the model volatility including
         averaging logarithms of past usage values as indicated by the history of past usage of the device, and
         calculating a variance of the logarithms of the past usage values, and
      calculating by the computer a revenue estimate for the usage-based schedule of prices that factors in discounts by looping over periods of usage and performing:
         setting a price for the period to a base price;
         determining average usage for the period; and
         when the average usage for the period exceeds a discount usage, applying a discount to reset the price.

2. The method of claim 1, wherein:
   the estimates of service usage comprise an estimated high usage, an estimated low usage, and a swing range of percentiles; and
   the calculating the model volatility comprises:
      calculating a first volatility based on the swing range of percentiles, the estimated high usage, and a cumulative density function,
      calculating a second volatility based on the swing range of percentiles, the estimated low usage, and a cumulative density function, and
      calculating the model volatility based on the first and second volatilities.

3. The method of claim 2, wherein the cumulative density function is a cumulative lognormal density function.

4. The method of claim 1, further comprising:
   receiving a set of discount rules; and
   the calculating the revenue estimate for the usage-based schedule of prices is further performed in response to the set of discount rules.

5. The method of claim 4, wherein the discount rules comprise rules based on one or more of: usage history or usage thresholds.

6. The method of claim 1, further comprising:
receiving a set of anchor values representing usage-independent revenue rates; wherein
the calculating the revenue estimate for the usage-based schedule of prices is based on the anchor values.

7. The method of claim 1, wherein
the estimates of service usage comprise an estimated high usage, an estimated low usage, and a swing range of percentiles, for each time period in a plurality of time periods; and
the calculating the model volatility comprises:
calculating a first volatility based on the swing range of percentiles, the estimated high usage, and a cumulative density function, for each time period in a plurality of time periods,
calculating a second volatility based on the swing range of percentiles, the estimated low usage, and a cumulative density function, for each time period in a plurality of time periods, and
calculating the model volatility based on the first and second volatilities, for each time period in a plurality of time periods.

8. The method of claim 7, wherein the cumulative density function is a cumulative lognormal density function.

9. A computer system for providing a pricing algorithm for a device, the device being a hardware resource or a software application, comprising:
a memory for storing computer-executable instructions that implement:
a component that receives estimates of service usage for the device including a history of past usage of the device;
a component that receives a usage-based schedule of prices for the device; and
a component that, in response to the receiving the estimates of service usage and the receiving the schedule of prices:
calculates a model volatility of service usage relating to statistical variation in expected service usage of the device, the calculating of the model volatility including
averaging logarithms of past usage values as indicated by the history of past usage of the device, and
calculating a variance of the logarithms of the past usage values, and
calculates a revenue estimate for the usage-based schedule of prices that factors in discounts by looping over periods of usage and performing:
setting a price for the period to a base price;
determining average usage for the period; and
when the average usage for the period exceeds a discount usage, applying a discount to reset the price; and
a processor for executing the computer-executable instructions stored in the memory.

10. The system of claim 9, wherein:
the estimates of service usage comprise an estimated high usage, an estimated low usage, and a swing range of percentiles; and
the component that calculates the model volatility comprises:
a component that calculates a first volatility based on the swing range of percentiles, the estimated high usage, and a cumulative density function,
a component that calculates a second volatility based on the swing range of percentiles, the estimated low usage, and a cumulative density function, and
a component that calculates the model volatility based on the first and second volatilities.

11. The system of claim 10, wherein the cumulative density function is a cumulative lognormal density function.

12. The system of claim 9, further comprising:
a component that receives a set of discount rules; and
the component that calculates the revenue estimate for the usage-based schedule of prices is configured to operate in response to the set of discount rules.

13. The system of claim 12, wherein the discount rules comprise rules based on one or more of: usage history or usage thresholds.

14. The system of claim 9, further comprising:
a component that receives a set of anchor values representing usage-independent revenue rates; wherein
the component that calculates the revenue estimate for the usage-based schedule of prices is configured to operate in response to the anchor values.

15. The system of claim 9, wherein:
the estimates of service usage comprise an estimated high usage, an estimated low usage, and a swing range of percentiles, for each time period in a plurality of time periods; and
the component for calculating the model volatility comprises:
a component for calculating a first volatility based on the swing range of percentiles, the estimated high usage, and a cumulative density function, for each time period in a plurality of time periods,
a component for calculating a second volatility based on the swing range of percentiles, the estimated low usage, and a cumulative density function, for each time period in a plurality of time periods, and
a component for calculating the model volatility based on the first and second volatilities, for each time period in a plurality of time periods.

16. A computer-readable storage medium storing computer-executable instructions for execution by one or more processors for providing a pricing algorithm for a device, the device being a hardware resource or a software application, by performing a method comprising acts of:
receiving estimates of service usage for the device including a history of past usage of the device;
receiving a usage-based schedule of prices for the device; and
in response to the receiving the estimates of service usage and the receiving the schedule of prices:
calculating by a processor a model volatility of service usage relating to statistical variation in expected service usage of the device, the calculating of the model volatility including
averaging logarithms of past usage values as indicated by the history of past usage of the device, and
calculating a variance of the logarithms of the past usage values, and
calculating by a processor a revenue estimate for the usage-based schedule of prices that factors in pricing discounts.

17. The computer-readable storage medium of claim 16, wherein:
the estimates of service usage comprise an estimated high usage, an estimated low usage, and a swing range of percentiles, for each time period in a plurality of time periods; and the calculating of the model volatility comprises:
calculating a first volatility based on the swing range of percentiles, the estimated high usage, and a cumulative density function, wherein the cumulative density function is a cumulative lognormal density function, for each time period in a plurality of time periods,
calculating a second volatility based on the swing range of percentiles, the estimated low usage, and a cumulative density function, for each time period in a plurality of time periods, and
calculating the model volatility based on the first and second volatilities, for each time period in a plurality of time periods.

* * * * *

UNITED STATES PATENT AND TRADEMARK OFFICE
CERTIFICATE OF CORRECTION

PATENT NO. : 7,693,762 B1
APPLICATION NO. : 10/304467
DATED : April 6, 2010
INVENTOR(S) : Leonardo Dagum et al.

It is certified that error appears in the above-identified patent and that said Letters Patent is hereby corrected as shown below:

In column 4, line 45, after "$f(u) = \frac{1}{\sqrt{2\pi}\sigma u} e^{-\frac{(\ln u - \mu)^2}{2\sigma^2}}$" insert --(18)--.

In column 6, line 35, delete "$\bar{v} = \frac{1}{m}\sum_{i=1}^{m} v_i$" and insert -- $\bar{v} = \frac{1}{m}\sum_{i=1}^{m} v_i \quad (18)$ --, therefor.

In column 6, line 40, delete "$\bar{v} = \frac{1}{m}\sum_{i=1}^{m} v_i$" and insert -- $\sigma^2 = \frac{1}{m-1}\sum_{i=1}^{m}(v_i - \bar{v})^2 \quad (19) \quad \sigma^2 = \frac{1}{m-1}\sum_{i=1}^{m}(v_i - \bar{v})^2$ --.

In column 20, line 43, after "Gaussian" insert -- Models --.

In column 29, line 6, in Claim 7, delete "wherein" and insert -- wherein: --, therefor.

Signed and Sealed this
Fifteenth Day of February, 2011

David J. Kappos
*Director of the United States Patent and Trademark Office*